US012118532B2

(12) United States Patent
Shauh et al.

(10) Patent No.: US 12,118,532 B2
(45) Date of Patent: Oct. 15, 2024

(54) ONLINE MOBILE PAYMENT SYSTEM AND METHOD USING A SERVER BETWEEN THE PERSONAL COMUTER AND THE MOBILE PAYMENT DEVICE

(71) Applicants: Jack Shauh, San Diego, CA (US); Sami Rishmawi, Encinitas, CA (US)

(72) Inventors: Jack Shauh, San Diego, CA (US); Sami Rishmawi, Encinitas, CA (US)

(73) Assignee: VRAY INC., San Diego, CA (US)

( * ) Notice: Subject to any disclaimer, the term of this patent is extended or adjusted under 35 U.S.C. 154(b) by 873 days.

(21) Appl. No.: 15/585,962

(22) Filed: May 3, 2017

(65) Prior Publication Data
US 2018/0144332 A1    May 24, 2018

Related U.S. Application Data

(60) Provisional application No. 62/308,196, filed on Mar. 14, 2016.

(51) Int. Cl.
*G06Q 40/00* (2023.01)
*G06Q 20/32* (2012.01)
*G06Q 20/40* (2012.01)

(52) U.S. Cl.
CPC ......... *G06Q 20/325* (2013.01); *G06Q 20/322* (2013.01); *G06Q 20/401* (2013.01)

(58) Field of Classification Search
CPC ............................ G06Q 20/325; G06Q 20/401
USPC ......................................... 705/35–40, 41, 44
See application file for complete search history.

(56) References Cited

U.S. PATENT DOCUMENTS

| | | | |
|---|---|---|---|
| 7,630,937 B1* | 12/2009 | Mo | G06Q 20/10 705/34 |
| 10,853,783 B1* | 12/2020 | Maeng | G06Q 20/204 |
| 2008/0172317 A1* | 7/2008 | Deibert | G06Q 20/10 705/35 |
| 2011/0307388 A1* | 12/2011 | Kim | G06Q 20/3674 705/67 |
| 2012/0041879 A1* | 2/2012 | Kim | G06Q 30/06 705/44 |

(Continued)

FOREIGN PATENT DOCUMENTS

CA      2792894 A1 *    8/2011     ............. G06Q 20/32

OTHER PUBLICATIONS

Bezhovski et al: "The Future of the Mobile Payment as Electronic Payment System", European Journal of Business and Management, ISSN 2222-1905 (Paper) ISSN 2222-2839 (Online) vol. 8, No. 8,, Apr. 4, 2016 (Year: 2016).*

*Primary Examiner* — Edward J Baird
(74) *Attorney, Agent, or Firm* — PARSONS & GOLTRY; Robert A. Parsons; Michael W. Goltry

(57) ABSTRACT

A mobile payment system includes a web browsing capable device in communication with a world wide web to make purchases online at an online store. A mobile payment device having securely stored payment information is connectable to the web browsing capable device through a server to provide payment for the online purchase. The mobile payment device is associated with the web browsing capable device by a mobile identity. The online store is connectable to a payment network to exchange payment messages upon receiving an authorization request from the mobile device through the web browsing capable device.

14 Claims, 9 Drawing Sheets

(56) References Cited

U.S. PATENT DOCUMENTS

| | | | | |
|---|---|---|---|---|
| 2012/0109818 A1* | 5/2012 | Carlson | G06Q 20/10 | 705/39 |
| 2012/0150601 A1* | 6/2012 | Fisher | H04B 5/70 | 705/14.23 |
| 2012/0289188 A1* | 11/2012 | Marcus | G06Q 20/16 | 455/406 |
| 2013/0212007 A1* | 8/2013 | Mattsson | G06Q 20/405 | 705/39 |
| 2013/0275308 A1* | 10/2013 | Paraskeva | G06Q 20/02 | 705/71 |
| 2014/0038548 A1* | 2/2014 | Sato | H04M 15/68 | 455/406 |
| 2014/0101046 A1* | 4/2014 | O'Connor | G06Q 20/12 | 705/44 |
| 2014/0344154 A1* | 11/2014 | Flurscheim | G06Q 20/10 | 705/44 |
| 2015/0170141 A1* | 6/2015 | Klingen | G06F 16/951 | 705/41 |
| 2016/0071087 A1* | 3/2016 | Mittal | G06Q 20/325 | 705/44 |
| 2016/0098721 A1* | 4/2016 | Bogaard | G06Q 20/382 | 705/44 |
| 2016/0155112 A1* | 6/2016 | Phillips | G06K 19/06037 | 235/379 |
| 2016/0180320 A1* | 6/2016 | Klingen | G06Q 20/027 | 705/44 |
| 2017/0193468 A1* | 7/2017 | Chougule | G06Q 20/102 | |
| 2017/0228726 A1* | 8/2017 | Bohanan | G06Q 20/401 | |

* cited by examiner

ONLINE MOBILE PAYMENT SYSTEM AND METHOD USING A SERVER BETWEEN THE PERSONAL COMUTER AND THE MOBILE PAYMENT DEVICE

CROSS-REFERENCE TO RELATED APPLICATION

This application claims the benefit of U.S. Provisional Application No. 62/308,196, filed 14 Mar. 2016.

FIELD OF THE INVENTION

This invention relates to mobile payment systems.
More particularly, the present invention relates to mobile payment for online purchases.

BACKGROUND OF THE INVENTION

In the payments industry, mobile payments systems are becoming more widely used. Mobile payment applications as a virtual credit/debit card are starting to be provided to mobile devices such as smart phones, tablets, watches and other wearable devices, and the like. Mobile payment methods currently include Apple Pay, Android Pay, etc. As an example, a mobile device capable of mobile payment, can be used in a point of sale (POS) terminal to pay for a sale in a retailer store. Mobile payment can provide strong security to prevent fraud by implementing EMV (Europay, MasterCard and Visa) Integrated Circuit Card Specifications for Payment Systems. Furthermore, mobile payment can provide strong security by implementing EMV Payment Tokenization Specifications, or a vendor specific payment token scheme.

However, the existing mobile payment cannot be used in online purchasing when the user is purchasing through a PC or other web browsing capable device and the mobile payment resides on a different mobile device. In this case, the user has to manually enter credit or debit card number on the web page of the online store, which can create security fraud because there is no strong authentication in the purchase process.

It would be highly advantageous, therefore, to remedy the foregoing and other deficiencies inherent in the prior art.

An object of the present invention is to provide a method and system of mobile payment for us with a PC.

Another object of the present invention is to provide a secure method and system of mobile payment for us with a PC.

SUMMARY OF THE INVENTION

Briefly, to achieve the desired objects and advantages of the instant invention, provided is a mobile payment system including a web browsing capable device in communication with a world wide web to make purchases online at an online store. A server is connected to the web browsing capable device, and a mobile payment device having securely stored payment information is connectable to the web browsing capable device through the server to provide payment for the online purchase. The mobile payment device is associated with the web browsing capable device by a mobile identity. The online store is connectable to a payment network to exchange payment messages upon receiving an authorization request from the mobile device through the web browsing capable device.

Also provided is a mobile payment method including the steps of providing a web browsing capable device, providing a mobile payment device having mobile payment capability, and providing a server connectable to the web browsing capable device and the mobile payment device. The web browsing capable device is used in communication with the Internet to make an online purchase at an online store. The mobile payment device is connected to the web browsing capable device through the server to make a mobile payment for the online purchase, and payment information is sent to a payment network.

Additionally, a payment request is sent from the web browsing capable device to the server. A payment information message is sent from the server to the mobile payment device using the mobile identity to identify the mobile device associated with the web browsing capable device. An authorization request is sent from the mobile payment device to the server, and a payment response is sent from the server to the web browsing capable device.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DETAILED DESCRIPTION OF THE PREFERRED EMBODIMENTS

Figure 1:
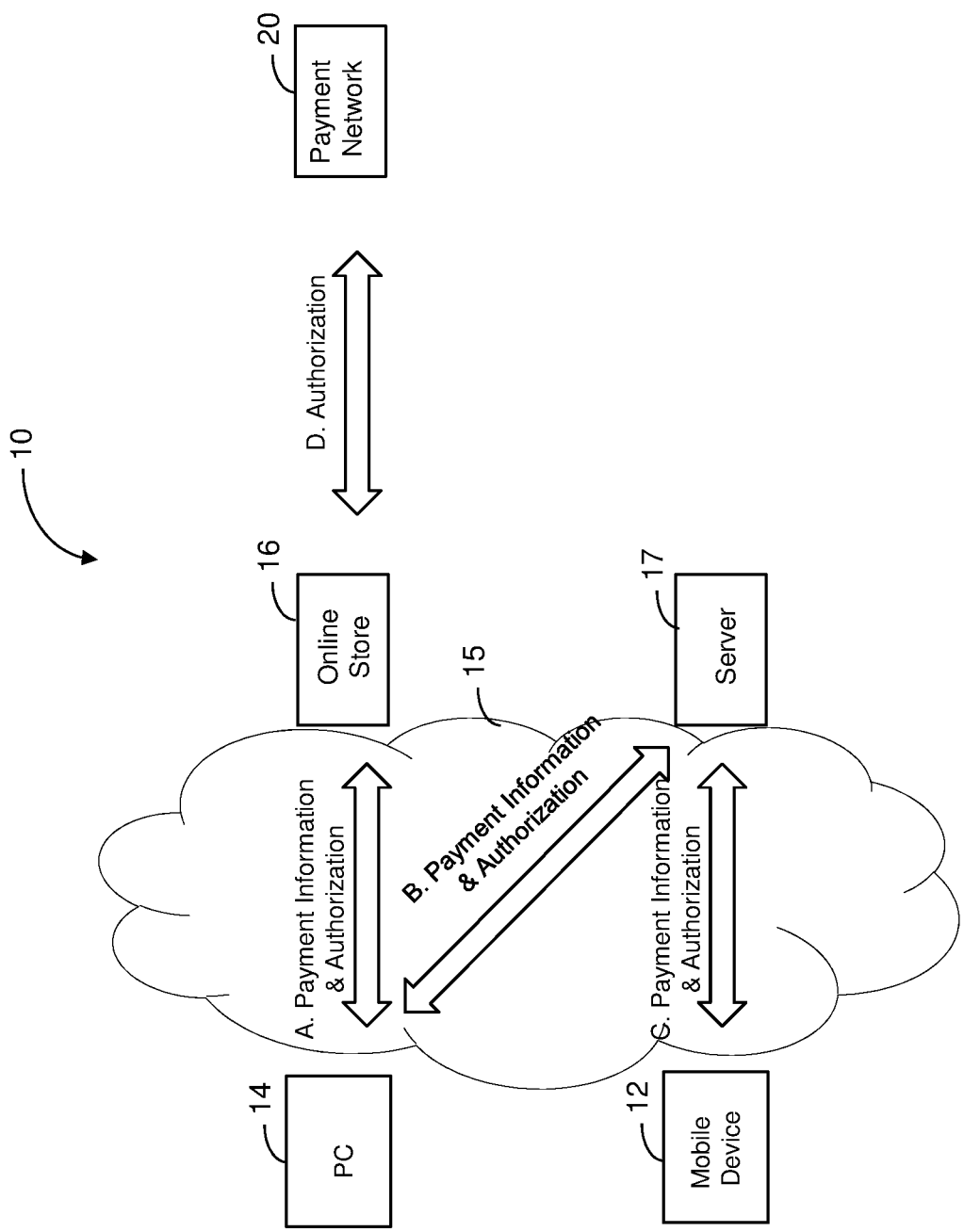
FIG. 1 is simplified block diagram of the payment system according to the present invention.

Turning now to the drawings in which like reference characters indicate corresponding elements throughout the several views, attention is first directed to FIG. 1 which illustrates a payment system 10 including a mobile payment device 12 and a PC 14 (web browsing capable device). Mobile payment device 12 is a device with computing capability and is embedded with a secure element or utilizes emulation software to emulate a secure element to securely store credit/debit card information, payment credentials, one-time credit/debit card number, payment token, digital currency, etc. Mobile payment device 12 can be a smart phone, a tablet, a wearable device (e.g. watch), or even a laptop computer, embedded with a secure element or utilizing emulation software to emulate a secure element, that stores credit/debit card, payment credentials, one-time credit/debit card number, payment token, digital currency, etc. Currently mobile payment platforms include Apple Pay, Android Pay and the like. PC 14 can be any browser capable device such as a desktop computer, a laptop computer, a tablet computer, mobile phone (or smart phone), self-checkout kiosk, etc. to browse products of the online store. In this case, PC 14 is either incapable of mobile payment, or mobile payment is undesirable from that specific device. System 10 enables a secondary device, in this case mobile payment device 12 to pay for online purchases at online store 16 made from PC 14. It will be understood that the term online refers to communication through a world wide web such as the Internet 15, a global communications network. Many users prefer to browse on a larger device such as a desk top computer, a lap top computer, a tablet computer, and the like, because a larger viewing area is provided. Unfortunately, mobile payment is not available on many of these systems. System 10 allows browsing on a PC 14 while facilitating payment with a mobile payment device 12.

To allow communication with mobile device 12, thereby providing payment, a server 17 is provided to couple PC 14 to mobile device 12. During the purchase process, PC 14 receives payment information from online store 16 through an interface A. PC 14 sends the payment information to server 17 via an interface B. Server 17 then forwards the payment information to mobile device 12 via an interface C. As will be understood, interfaces A, B, and C can be wireless or wireline connections through a network (Internet 15) such as the world wide web. In addition, the connection for interface A can be initiated by the browser of PC 14, and the connection for interface B can be initiated by the browser of PC 14 as well. Mobile device 12 sends an authorization request with a payment token to server 17 via interface C, and then server 17 forwards the authorization request with payment token to PC 14 via interface B. At this point, PC 14 is able to send the authorization and payment token to online store 16. It will be understood that server 17 is preferably a separate entity from a server of online store 16. Server 17 can be operated by a third party company or can be owned by online store 16. An advantage of system 10 is that online store 16 only use a standard connection, interface A, with PC 14, to provide payment information and receive authorization requests, and therefore only a minimum change to online store 16 is needed.

To enable a connection between PC 14 and mobile device 12, server 17 must be able to discern the correct mobile device from which payment is to come. This may require a user to enter a mobile identity using PC 14. A mobile identity can include information such as the mobile devices telephone number and the like. Alternatively, the user may have previously registered mobile device 12 with server 17. In this case, a mobile identity is stored by server 17 to specify a specific mobile device 12. The registration includes information such as a user name, email address, or nickname, etc. to provide a mobile identity for mobile device 12 which is associated with a unique identifier such as year of birth, last 4 digits of social security number, passwords, etc. stored in server 17. When the user logs in to server 17 via PC 14 using a user name, server 17 can retrieve the stored mobile identity to know from which mobile device to expect payment. Or the user may provide an email address or nickname for server 17 to retrieve the mobile identity. If there is more than one mobile identity, server 17 may send all these identities to PC 14 and request user to choose one.

As an example of general use, PC 14 connects to online store 16 via interface A of Internet connection 15. Mobile device 12 is capable of mobile payment and is reachable by server 17 using interface C of Internet link 15 to exchange mobile payment messages. Mobile device 12 can use 2G, 3G, or 4G cellular networks, or home, private or public Wi-Fi as the access technology of Internet 15. Server 17 connects between PC 14 and mobile device 12. Online store 16 connects to a payment network 20 (e.g. comprising payment gateway, acquirer, card network, and card issuer) through interface D to process the credit, debit or bank card transaction approval received from PC 14.

Figure 2:
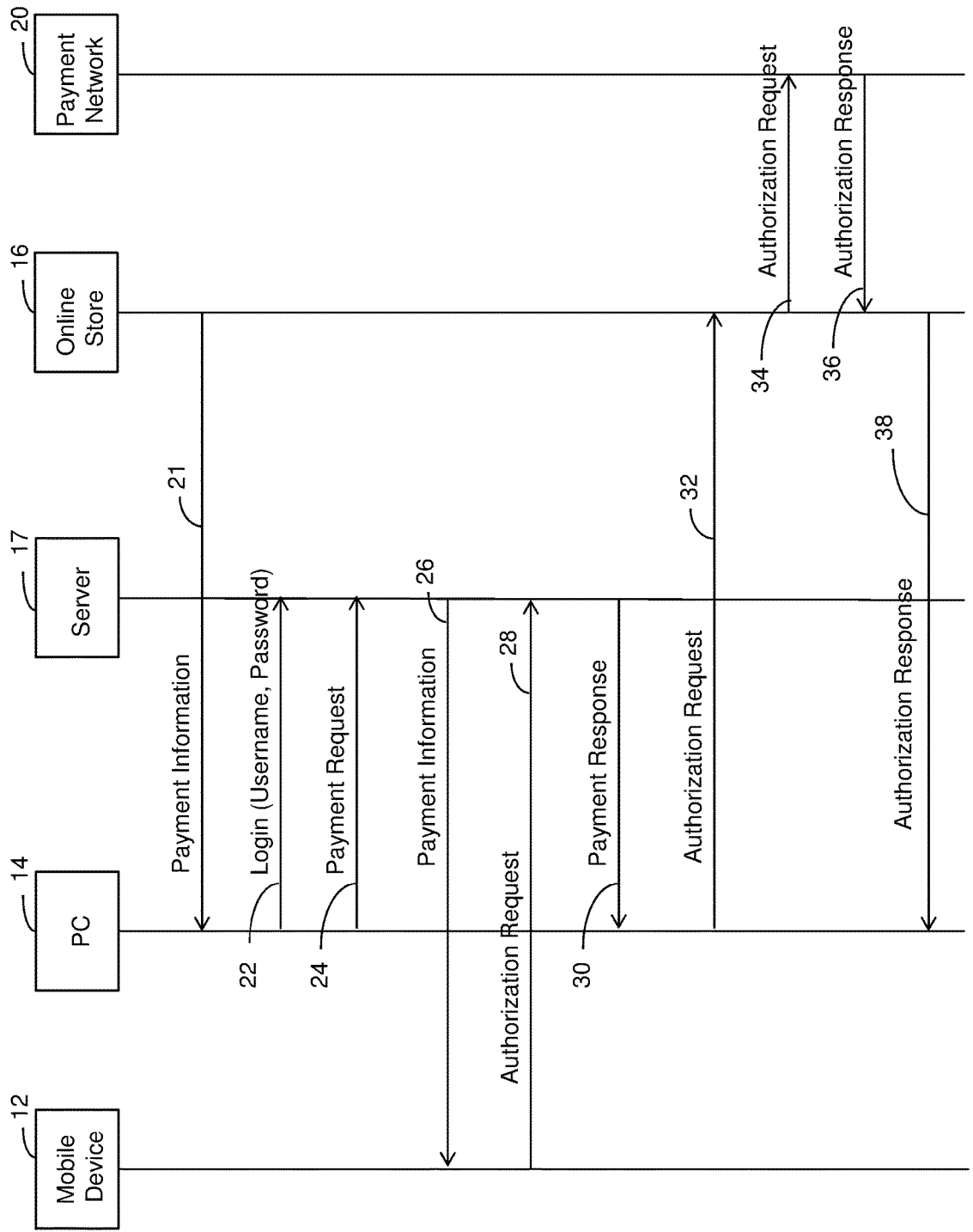
FIG. 2 is a schematic of the message exchange between elements of the payment system and a user, according to the present invention.

Referring now to FIG. 2, an example of the message flow for a mobile payment using system 10 is illustrated. To provide the required functionality, browser of PC 14 can run a software script from the web page of online store 16; mobile payment device 12 can install 3rd party software to enable these messages and procedures. Alternatively, PC 14 may need to install 3rd party software to enable these messages and procedures. Online store 16 also needs some software plugin, such as in the web page to provide a software script, to run in the browser context of PC 14 to convey data or messages between online store 16 and server 17.

The user uses PC 14 to browse products of online store 16 and add selected products to the shopping cart well known in the art. The user intends to purchase on the web page of online store 16 and receives payment information 21 from online store 16. Payment information can include the product being purchased, shipping information, billing information, etc. Payment information can also include payment amount, merchant identity, transaction time, transaction identity, the address of Server (e.g. HTTP URL address), billing information, etc. The user then performs a login step 22 to set up a session with server 17. Login 22 is accomplished by providing a user name and a password to access server 17. If the login succeeds, server 17 can put a secure cookie in PC 14 that will allow skipping login procedure in the future. PC 14 then sends a payment request 24 to server 17. Payment request 24 can include payment amount, merchant identity, transaction time, transaction identity, mobile identity, billing information, etc. Mobile identity is provided by the user in this step to identify the mobile device to be used. Alternatively, sending a mobile identity is unnecessary and server 17 can instead retrieve the mobile identity for the mobile device from its database by using the username in the login procedure. Mobile identity can be a mobile phone number, a mobile device hardware identity, or an email address that is associated with a mobile device, and the like.

Server 17 receives payment request 24 and sends payment information 26, including information such as payment amount, merchant identity, transaction time, transaction identity and the like, to mobile device 12. Server 17 knows the correct mobile device 12 to communicate with by using the mobile identity. For example, if the telephone number of the mobile device is known, server 17 can send an SMS to mobile device 12 to trigger a data session set up. Or mobile device 12 continues to maintain a HTTP (or HTTPS) session with server 17 with the mobile identity of the HTTP (or HTTPS) session. Then server 17 can push the payment information in payment information 26 to mobile device 12. Payment information includes payment amount, merchant identity, transaction time, transaction identity, etc.

Upon receiving payment information 26, mobile device 12 displays payment information to the user for confirmation, and prompts the user to enter PIN (or passcode), fingerprint, or the like, and generates a payment token after the PIN (or passcode) or fingerprint, etc. is successfully verified. Mobile device 12 then sends a authorization request 28 to server 17. Authorization request 28 can include the payment token, payment amount, merchant identity, transaction time, transaction identity, etc. Server 17 receives authorization request 28 and sends a payment response 30 to PC 14. The transaction identity from payment request 24 can be used by server 17 to send payment response 30 to PC 14. Payment response 30 can include payment token, payment amount, merchant identity, transaction time, transaction identity, status code, etc. The status code can be used to indicate an error scenario if payment request 24 has an error, like mobile identity is not correct and the like. If everything is working properly, the status code is 'Success'. Alternatively, payment response 30 can additionally include billing information (e.g. billing address, zip code, name, and phone number) that was provided in the registration procedure earlier by the user to server 17. In this case, the user does not need to enter billing information on the web page of online store 16 during purchase.

PC 14 receives payment response 30 and sends an authorization request 32 to online store 16. Authorization request 32 can include payment token, payment amount, merchant identity, transaction time, transaction identity, etc. Online store 16 then sends an authorization request 34 to payment network 20. Payment network 20 processes the transaction and replies with an authorization response 36 to online store 16. Online store 16 sends an authorization indication to PC 14 to indicate the status, e.g. approval and completion, of the purchase.

Figure 3:
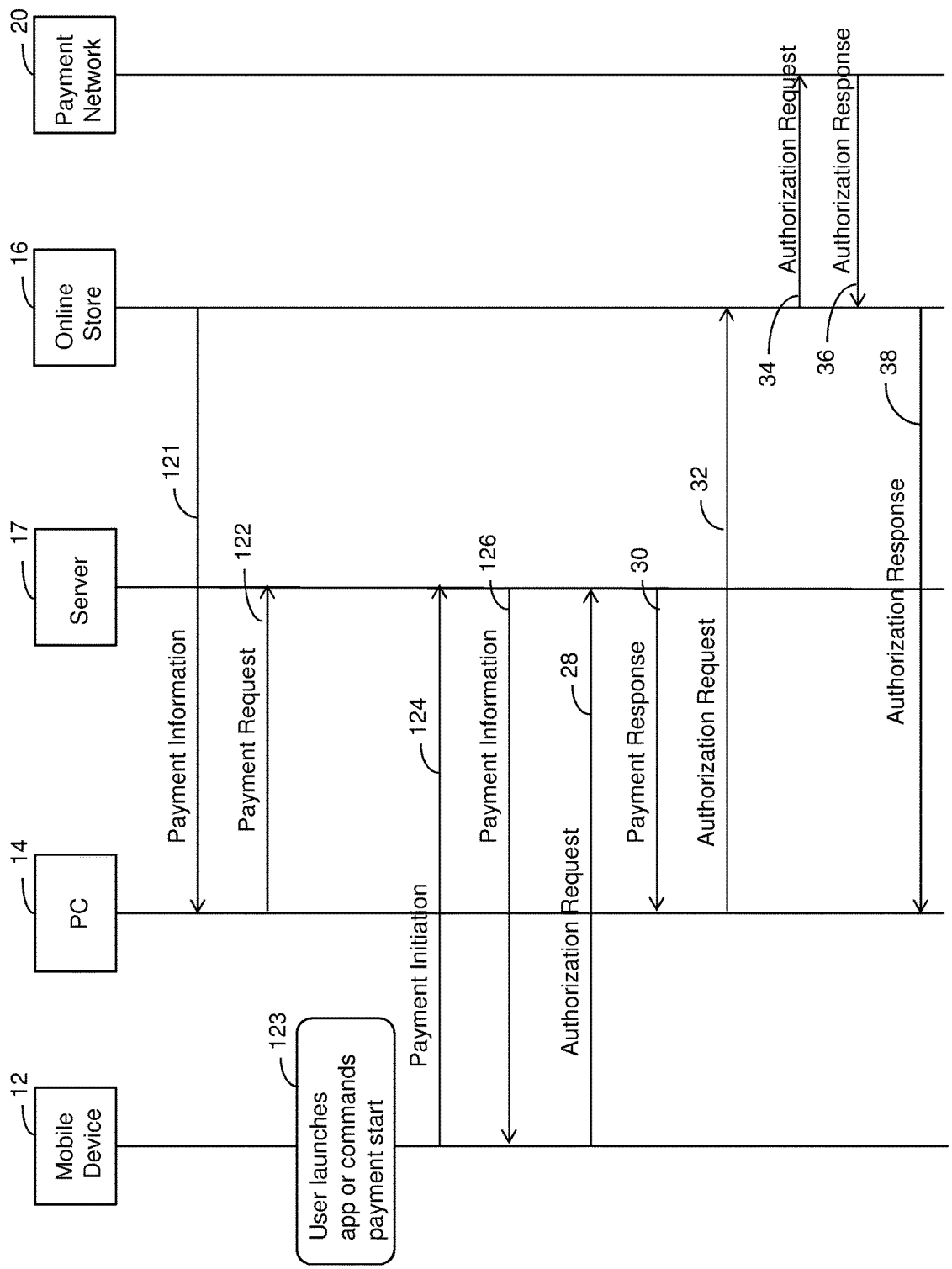
FIG. 3 is another schematic of the message exchange between elements of the payment system according to the present invention.

Referring now to FIG. 3, another example of the message flow for a mobile payment using system 10 is illustrated. After the user decides to make payment, and sends to online store 16 purchase information, including the product to purchase, shipping information, billing information, etc., online store 16 sends payment information 121 to PC 14. Payment information 121 can include payment amount, merchant identity, transaction time, transaction identity, billing information, the address of Server (e.g. HTTP URL address), etc. In addition, online store 16 can provide an authentication code in payment information 121 for server 17 to verify that PC 14 truly did make the purchase. The authentication code may be generated by provisioning security association between server 17 and the server for online store 16, and can depend on payment information 121 and a transaction time to prevent reuse. Furthermore, PC 14 can display a message to prompt the user to launch an app of mobile device 12, and command payment start as will be described presently. PC 14 establishes a session with server 17, using the address of server 17 acquired previously, and sends a payment request 122 to server 17. Payment request 122 includes information necessary to the transaction, such as payment amount, merchant identity, transaction time, transaction identity, mobile identity, billing information, authentication code, cookie, etc. The mobile identity can be provided by the user after launching the app or the app of the mobile can retrieve the previously stored mobile identity in the mobile device. Server 17 receives payment request 122 and verifies the authentication code that PC 14 did make the purchase. In addition, server 17 can verify billing information that may be registered or that was used previously by the user. Furthermore, server 17 can verify if there is a valid cookie that was stored in a previous transaction. If any or some of verification fails, server 17 can reject payment request 122. If verification passes, server 17 will wait for the establishment of a session with mobile device 12 for further processing. Server 17 starts a timer to establish a time window in which the session with mobile device 12 must occur.

The user launches an app on mobile device 12 which will ask the user to click a button to command payment start 123. Then mobile device 12 establishes a session with server 17 and sends a payment initiation 124 to server 17. Payment initiation 124 includes information necessary to the transaction, such as mobile identity, etc. Server 17 receives payment initiation 124 and correlates the session from mobile device 12 to the session from PC 14 by using the mobile identity. Server 17 clears the timer, assuming the session with mobile device 12 occurs in the appropriate time window. Accordingly, PC 14 and mobile device 12 are able to exchange messages via server 17. Server 17 sends payment information 126 to Mobile Device 17. Payment information 126 includes information necessary to the transaction, such as payment amount, merchant identity, transaction time, transaction identity, etc. from payment request 122. The remaining steps are the same as described previously with respect to FIG. 2.

Figure 4:
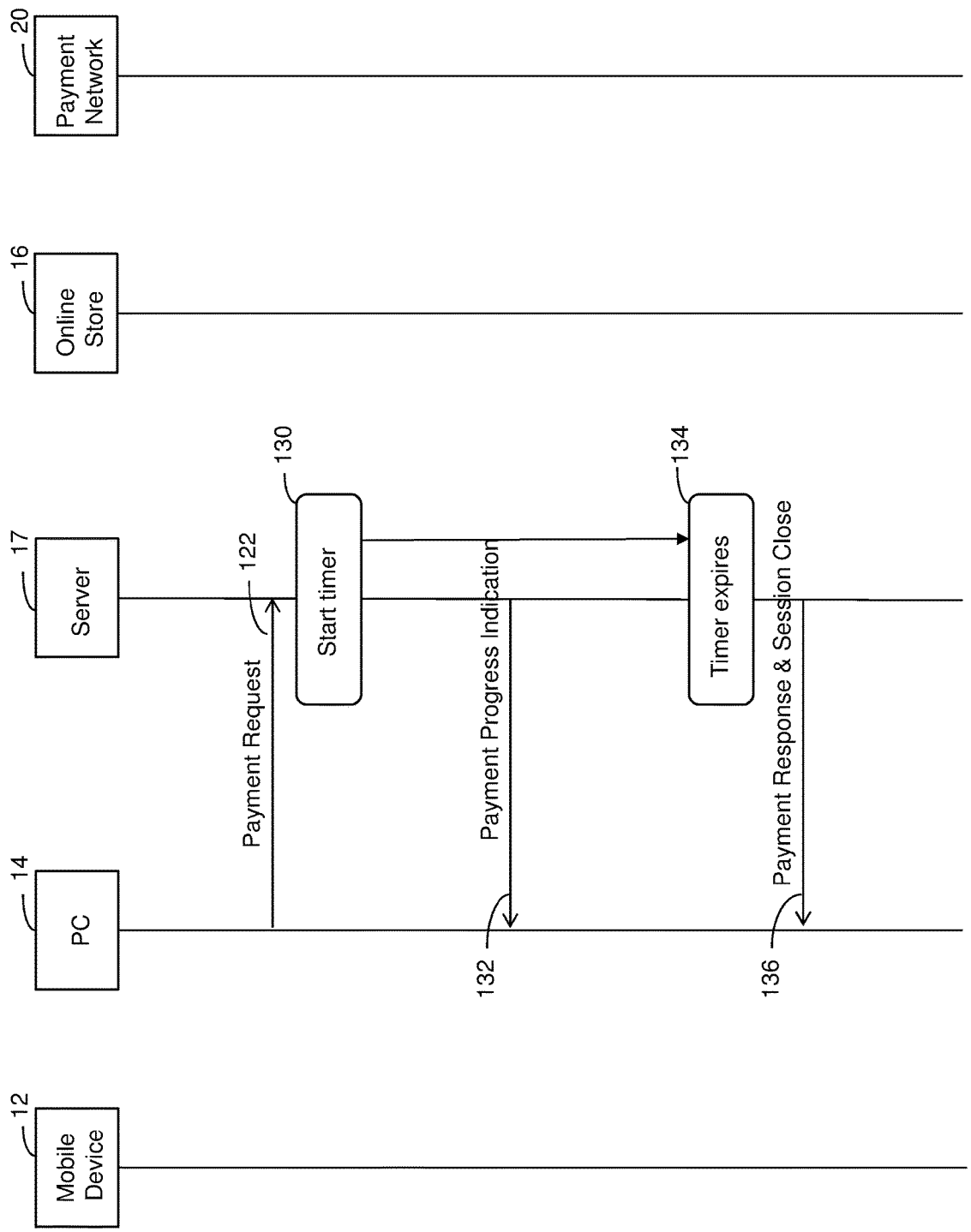
FIG. 4 is a schematic of the message exchange between elements of the payment system specifically related to a time window.

Referring now to FIG. 4, a message flow for a timer included in system 10 as described with respect to FIG. 3 is illustrated. PC 14 establishes a session with server 17 using the address of server 17 and sends payment request 122 to server 17. Payment request 122 includes information necessary to the transaction such as payment amount, etc. Server 17 receives payment request 122 and starts a time window 130. Server 17 can be instructed to send a payment progress indication 132 to PC 14 as a reminder to use mobile device 12 to launch app and command payment start during this time window if no session is established by mobile device 12. Server 17 can send indication periodically before time window 130 expires. In this example, mobile device 12 does not establish a session having matching mobile identity with server 17 within time window 130, and the time window expires 134. When time window 130 closes at timer expiration 134, and mobile device 12 has not established a session with server 17 having a matching mobile identity, server 17 sends a payment response 136 to PC 14 with status code being 'No Mobile Device Session' and closes the session with PC 14. Server 17 can log this event with time stamp, mobile identity, or even PC 14 identity or source IP address of PC 14. If server 17 sees too many error events of this status code i.e. 'No Mobile Device Session', in a short time interval, server 17 can block payment request of this mobile identity, or even PC identity, or source IP address.

Figure 5:
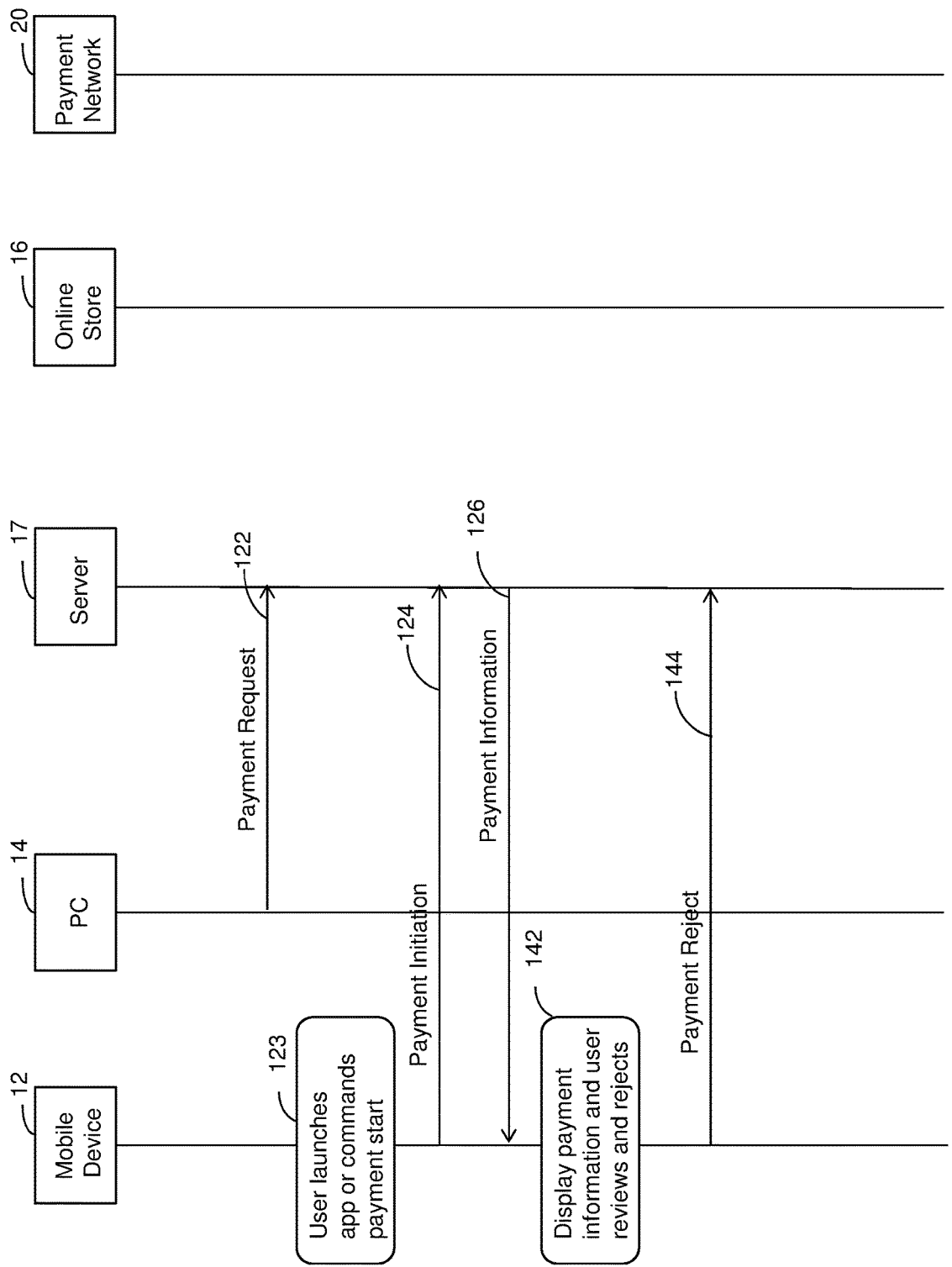
FIG. 5 is a schematic of the message exchange between elements of the payment system specifically related to a payment rejection.

Another communication procedure is shown in FIG. 5, illustrating a method of preventing unauthorized payment approval. PC 14 establishes a session with server 17 using the address of server 17 and sends payment request 122 to server 17. The user launches an app which may ask user to click a button to command payment start 123. At this time, mobile device 12 establishes a session with server 17 and sends a payment initiation 124 to server 17. Payment initiation 124 includes mobile identity. Server 17 receives payment initiation 124 and will correlate the session from mobile device 12 to the session from PC 14 by using the mobile identity. Server 17 sends payment information 126 to mobile device 12. Payment information 126 includes payment amount, merchant identity, transaction time, transaction identity, and the like. Mobile device 12 displays payment information 142 which can include payment amount, merchant name which is converted from merchant identity by using a look up table, etc. for the user to review. User reviews and discovers incorrect information. User clicks a reject button on the app and mobile device 12 sends payment reject 144 to server 17. When server 17 receives payment reject 144, server 17 logs this event with a time stamp, mobile identity, or even PC identity or source IP address of PC. If server 17 sees too many payment reject events in a short time interval, server 17 blocks payment request 122 of this mobile identity, or even PC identity, or source IP address.

Figure 6:
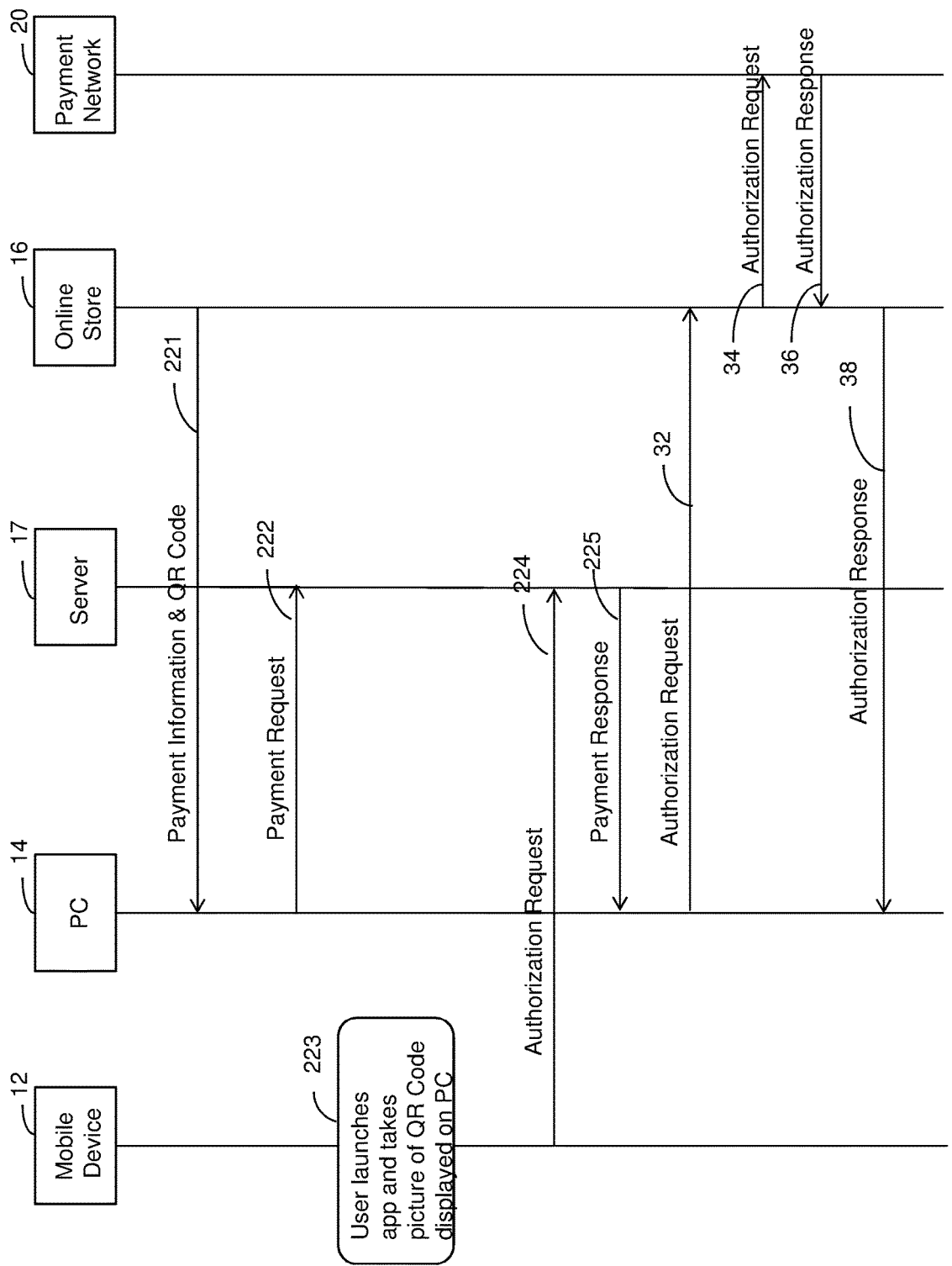
FIG. 6 is a schematic of the message exchange between elements of the payment system using a QR code.

Another communication procedure utilizing a QR code is shown in FIG. 6. Online store 16 sends payment information 221 to PC 14 after user decides to make payment and provides purchase information. Purchase information can include the product to purchase, shipping information, billing information, etc. Payment information 221 can include payment amount, merchant identity, transaction identity, billing information, the address of Server (e.g. HTTP URL address), authentication code, etc. Online store 16 can provide an authentication code for server 17 to verify that PC 14 truly did make the purchase. The authentication code can be generated by provisioning security association between server 17 and the server for online store 16, and can depend on payment information and time of transaction to prevent reuse. Part of payment information 221, e.g. payment amount, merchant identity, transaction time, transaction identity and authentication code, may be encoded in a QR Code and sent to PC 14 as well. Furthermore, PC 14 can display a message to prompt the user to launch app of mobile device, and use app to take a picture of the QR Code. PC 14 establishes a session with server 17 using the address of server 17 obtained from payment information 221 and sends a payment request 222 to server 17. Payment request 222 preferably includes payment amount, merchant identity, transaction time, transaction identity, mobile identity, billing information, authentication code, and the like. Server 17 receives payment request 222 and verifies the authentication code establishing that PC 14 originated the purchase. If verification fails, server 17 will reject payment request 222. If verification passes, server 17 will wait for a session to be initiated by mobile device 14 for further processing. In a preferred embodiment, server 17 opens a time window in which time the session must be initiated by mobile device 12 as described with respect to FIG. 4. User launches app and camera 223 of mobile device 12 to take a picture of the QR Code from payment information 221. The app decodes the QR Code and extracts necessary payment information.

After user reviews the payment details, and authorizes the transaction by entering a PIN (or passcode), fingerprint or other payment security information, mobile device 12 generates a payment token. Mobile device 12 establishes the session with server 17 and sends an authorization request 224 to server 17. Authorization request 224 includes information necessary to the transaction, such as payment token, mobile identity, transaction time, transaction identity, and the like. If server 17 receives authorization request 224 within the time window, server 17 will correlate the session with mobile device 12 to the corresponding session with PC 14 by using mobile identity, transaction time, transaction identity and the like. If there is a match, server 17 sends payment response 225 to corresponding PC 14 and clears the time window. The remaining steps are the same as described previously with respect to FIG. 2.

Figure 7:
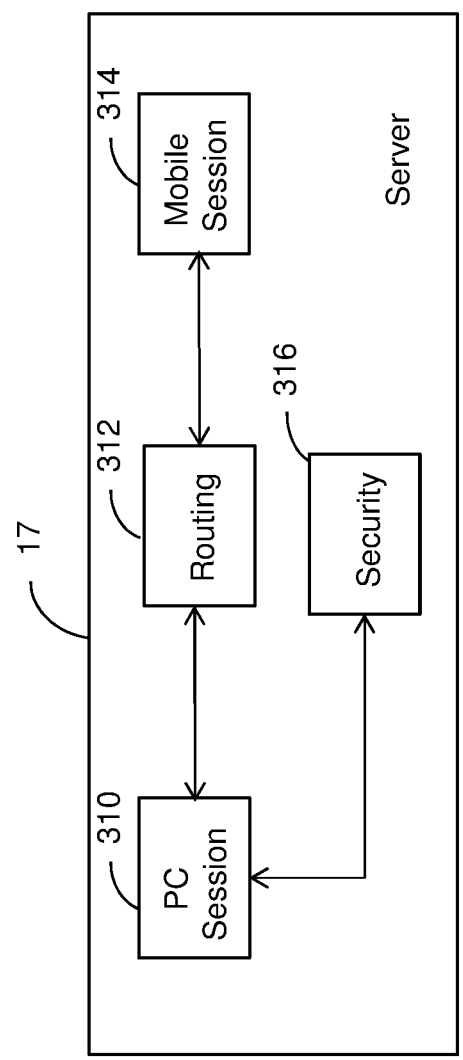
FIG. 7 is a simplified diagram of the functional components of a server.

Referring now to FIG. 7, a simplified diagram of the functional components of server 17 is illustrated. Server 17 includes a PC session component 310, a routing component 312, a mobile session component 314, and a security component 316. PC Session component 310 provides an instance of the session from each PC 14, exchanges messages with PC 14 and operates state machine of the protocol, and sends cookie to PC 14. Component 310 also sets up secured sessions, e.g. using HTTPS, and provides the time window within which the session with mobile device 12 must be initiated. Mobile session component 314 provides an instance of the session from each mobile device 12, exchanges messages with mobile device 12 and operate state machine of the protocol. It also sets up secured sessions, e.g. using HTTPS. Routing component 312 routes messages between PC session instances and mobile session instances by using some or all of mobile identity, transaction time, transaction identity, and the like. Security component 316 verifies PC session using authentication code, billing information, and cookie, verifies user login and password, logs events in error cases, and blocks or accepts the PC session.

Figure 8:
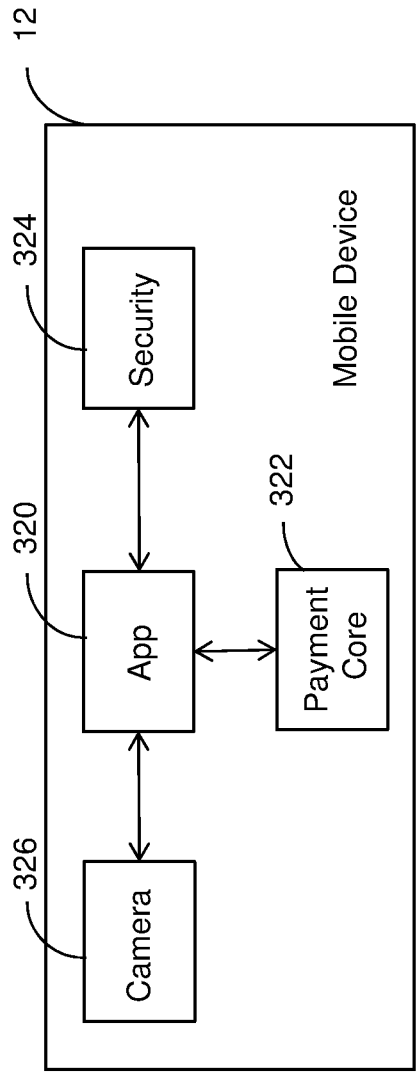
FIG. 8, a simplified diagram of the functional components of a mobile device.

Referring now to FIG. 8, a simplified diagram of the functional components of mobile device 12 is illustrated. Mobile device 12 includes an app which allows exchanging messages with server 17, establishes a secured session with server 17, e.g. using HTTPS, displays information to the user and accepts commands from the user, and processes QR Codes and extracts information therefrom. Mobile device 12 also includes a payment core 322. Payment core 322 provides a mobile payment core, e.g. Apple Pay, Android Pay, and/or the like, and generates payment tokens. A security module 322 sets up HTTPS with server 17 and supports PIN (or passcode), fingerprint, or other verification processes. A camera 326 is included to take pictures of the QR Code.

Figure 9:
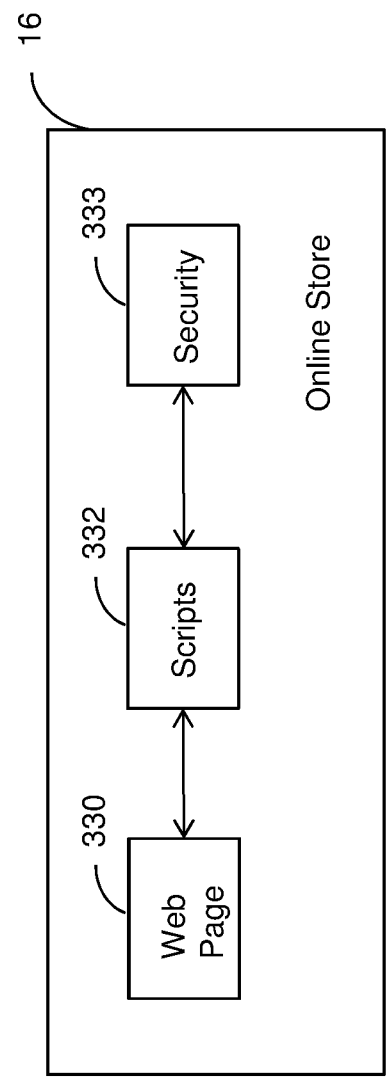
FIG. 9 is a simplified diagram of the functional components of a server of the online store.

Referring now to FIG. 9, a simplified diagram of the functional components of the server of online store 16 is illustrated. The server for online store 16 includes a webpage 330 to exchange information with PC 14 and to provide product information and receive purchase information. A script 332 provides options for the user to select the mobile device to pay, provides the address of server 17 and exchanges messages with server 17 or mobile device 12. It also generates a QR Code of payment information. Security 333 sets up HTTPS with server 17, and generates the authentication code.

Figure 10:
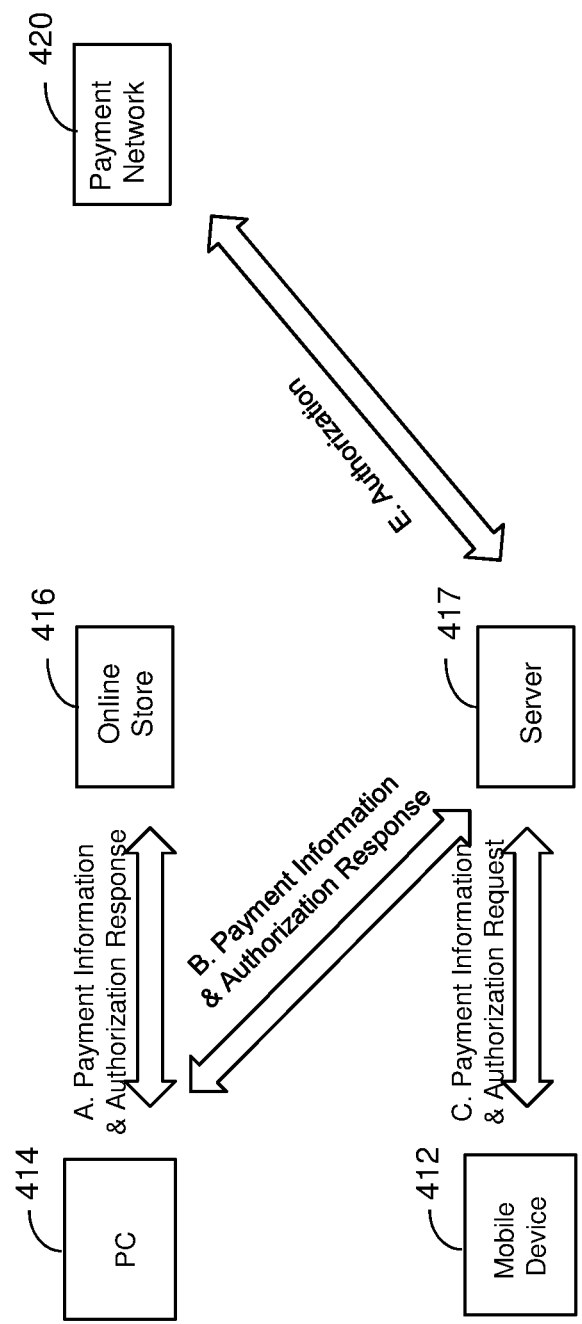
FIG. 10 is a simplified block diagram of another embodiment of the payment system according to the present invention.

Turning now to FIG. 10, another embodiment of a payment system 410 including a mobile payment device 412, a PC 414 (web browsing capable device) online store 416 and server 417 is illustrated. In this embodiment, the communication between PC 414 and online store 416, PC 414 and server 417, and mobile device 412 and server 417 is the same as described previously. The difference is that a payment network 420 provides authorization directly to server 417 instead of online store 416. This arrangement requires fewer messages exchanged, but also requires more functional support on server 417.

Various changes and modifications to the embodiments herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

1. A mobile payment system comprising:
   a web browsing capable device in communication with a world wide web to make purchases online at an online store, the web browsing capable device not having mobile payment capability and not having usable securely stored payment information;
   a server connected to the web browsing capable device;

a mobile payment device includes a mobile payment capability having a secure element or emulation software to emulate a secure element securely storing payment information, the mobile payment device connected to the web browsing capable device through the server to provide payment for the online purchase;

the mobile payment device associated with the web browsing capable device by a mobile identity; and wherein the online store is connected to a payment network to exchange payment messages therewith upon receiving an authorization request from the mobile device through the web browsing capable device.

2. A mobile payment system as claimed in claim 1 wherein the authorization request includes a payment token generated by the mobile payment capability.

3. A mobile payment system as claimed in claim 1 wherein the mobile payment device includes an app which will ask the user to click a button to command payment and connect to the server, the mobile payment device associated with the web browsing capable device by the mobile identity.

4. A mobile payment system as claimed in claim 1 wherein the mobile payment device is connectable to the server through an internet link.

5. A mobile payment system as claimed in claim 1 wherein the mobile payment device is registered to the server with a mobile identity prior to the purchase.

6. A mobile payment system as claimed in claim 1 wherein the server includes a timer to establish a time window in which a session with the mobile payment device must occur.

7. A method of purchasing products with a mobile payment comprising the steps of:
  browsing an online store using a web browsing capable device in communication with a world wide web, the web browsing capable device not having a usable mobile payment platform;
  selecting, using the web browsing capable device, a product to be purchased from the online store;
  receiving payment information, by the web browsing capable device, for the selected product to be purchased from the online store;
  connecting the web browsing capable device to a server;
  sending a payment request from the web browsing capable device to the server, the payment request including the payment information;
  identifying, by the server, a mobile payment device having a mobile identity and mobile payment capability including at least one mobile payment platform using the mobile identity;
  determining that the mobile identity indicates that the mobile payment device is associated with the web browsing capable device;
  connecting the server to the mobile payment device;
  sending the payment information from the server to the mobile payment device;
  using the mobile payment capability of the mobile device to create an authorization request including a payment token on the mobile payment device upon receipt of the payment information from the server;
  sending the authorization request including the payment token to the server from the mobile payment device;
  sending a payment response including the authorization request with payment token from the server to the web browsing capable device;
  sending the payment response, including the authorization request with payment token, from the server to the online merchant through the web browsing capable device; and
  sending the authorization request with payment token from the payment response received by the online merchant from the mobile payment device to a payment network to process the mobile payment.

8. A method as claimed in claim 7 wherein the step of connecting the server to the mobile payment device using a mobile identity to identify the mobile payment device includes sending the mobile identity to the server in the payment request.

9. A method as claimed in claim 7 wherein the step of connecting the server to the mobile payment device using a mobile identity to identify the mobile payment device includes registering the mobile payment device with the server.

10. A method as claimed in claim 9 wherein the step of registering the mobile payment device includes setting up an account, assigning the mobile identity to the mobile device, and storing the mobile identity on the server.

11. A mobile payment method comprising the steps of :
  providing a web browsing capable device not having a usable payment platform;
  providing a mobile payment device having mobile payment capability including at least one mobile payment platform and a mobile identity;
  providing a server connectable to the web browsing capable device and the mobile payment device;
  browsing an online store using the web browsing capable device in communication with a world wide web;
  selecting, using the web browsing capable device, a product from the online store;
  receiving, by the browsing capable device, payment information from the online store;
  sending a payment request including the payment information from the web browsing capable device to the server in response to receiving the payment information;
  providing the server with the mobile identity associated with the mobile device;
  identifying the mobile payment device using the mobile identity;
  determine that the mobile identity indicates that the mobile payment device is associated with the web browsing capable device;
  connecting the server to the mobile payment device;
  sending the payment request including the payment information from the server to the mobile payment device;
  sending an authorization request including a payment token from the mobile payment device, generated by the mobile payment capability, to the server in response to receiving the payment request;
  sending a payment response, including the authorization request with payment token, from the server to the web browsing capable device in response to receiving the authorization request from the mobile payment device;
  sending the payment response, including the authorization request with payment token, from the web browsing capable device to the online store; and
  sending the authorization request with payment token from the online store to a payment network to process the mobile payment in response to receiving the payment response from the web browsing capable device.

12. The method of claim 11 wherein the step of providing the server with a mobile identity associated with the mobile payment device includes registering the mobile payment device with the server prior to the online purchase.

13. The method of claim 11 wherein the step of providing the server with a mobile identity associated with the mobile payment device includes storing the mobile identity associated with the user information, retrieving the mobile identity corresponding to the user information from login by the web browsing capable device, and sending the mobile identity from the web browsing capable device to the server with the payment request.

14. The method of claim 11 wherein the step of sending an authorization request to a payment network includes the server providing an interface with the payment network.

\* \* \* \* \*